United States Patent [19]

Lenze et al.

[11] Patent Number: 4,595,219
[45] Date of Patent: Jun. 17, 1986

[54] GAS TIGHTLY SEALED JOINT IN OIL FIELD TUBULAR GOODS

[75] Inventors: Friedrich Lenze, Ratingen; Erwin Jedamzik, Kempen, both of Fed. Rep. of Germany

[73] Assignee: Mannesmann Aktiengesellschaft, Duesseldorf, Fed. Rep. of Germany

[21] Appl. No.: 462,382

[22] Filed: Jan. 31, 1983

[30] Foreign Application Priority Data

Feb. 3, 1982 [DE] Fed. Rep. of Germany ................ 3203857724

[51] Int. Cl.$^4$ ............................................. F16L 25/00
[52] U.S. Cl. .................................... 285/333; 285/355; 285/332.2
[58] Field of Search ............... 285/333, 334, 355, 349, 285/332.2

[56] References Cited

U.S. PATENT DOCUMENTS

| | | | |
|---|---|---|---|
| 2,104,799 | 1/1938 | Evans | 285/333 X |
| 2,110,825 | 3/1938 | Archer | 285/332.3 X |
| 3,508,771 | 4/1970 | Duret | 285/334 |
| 4,085,951 | 4/1978 | Morris | 285/334 |
| 4,253,687 | 3/1981 | Maples | 285/332.2 |

Primary Examiner—Richard J. Scanlan, Jr.
Attorney, Agent, or Firm—Ralf H. Siegemund

[57] ABSTRACT

A pin member with conical thread is threaded into a box or sleeve member having matching conical threading with abutment of the end of the box or sleeve against a shoulder on the pin member; that shoulder is continued into a groove in the pin member receiving a conically distorted polytetrafluoroethylene ring sealingly cooperating with a frustoconical surface of the box or sleeve member near its abutment end. The ring has been placed into the groove after having been heated to a temperature above the crystalline/amorphous transition temperature but below the liquification and decomposition temperatures.

7 Claims, 2 Drawing Figures

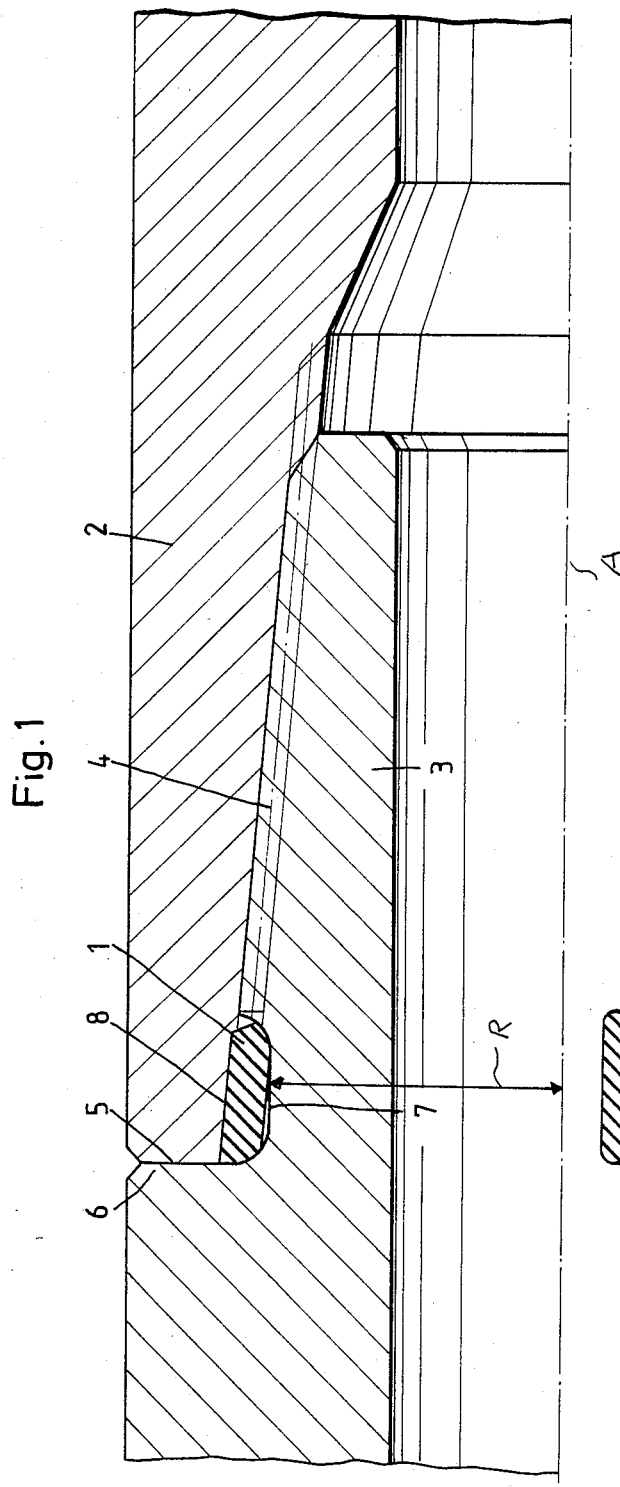
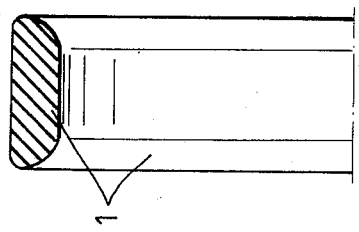

GAS TIGHTLY SEALED JOINT IN OIL FIELD TUBULAR GOODS

BACKGROUND OF THE INVENTION

The present invention relates to oil field tubular goods and here particularly to fluid tight joints between, for example, a box or sleeve member and a pin member of drill pipe with weld-on tool joint.

Joints of the type to which the invention pertains are, for example, provided with a polytetrafluoroethylane ring which is disposed in a groove and seals the two members against each other and particularly the interior of the two members against the common exterior. The ring used fills the groove completely so that particularly upon threading the two members into each other a gas and liquid tight seal is obtained. A seal and joint in accordance with the general principles outlined above is for example disclosed in German printed patent application No. 11 29 125. Herein a groove is provided in the essentially cylindrical surface of the sleeve part of the joint. Also, French Pat. No. 13 60 257 suggests to provide such a resilient sealing element in a groove which is disposed in a radial shoulder of the joining sleeves.

It was found that sealing constructions in accordance with the known principles requires supplemental and additional expenditure for making the joint as compared with the joints of the type in which a metal-to-metal seal is employed. On the other hand, metal-to-metal seals require a very high degree of accuracy and close tolerances as far as machining the relevant portions in the sleeve as well as in the pin member is concerned. Still, the last mentioned pipes of joints are favored. Particular criterium in the metal-to-metal seal type joints is the relative sensitivity of the pin member and here particularly of the outer sealing surfaces being located right at the end of the pin. When exposed, they can easily be damaged, particularly during transportation and in the case of inept installations. Also, it has to be considered that making up of a joint is usually carried out with one member being inserted in the bore hole and another one is suspended above by means of an oil derrick. The freely suspended casing may well begin to swing and the pin member end may hit some part and be damaged. As to sealed casing joints see also U.S. Pat. Nos. 2,907,589; 3,667,784; 3,100,656; 3,489,438 and German Pat. No. 600537.

DESCRIPTION OF THE INVENTION

It is an object of the present invention to provide a new and improved joint between oil field tubular goods such as casings or a casing member and a sleeve whereby the joint is to be gas tight and sealed against penetration of liquids at least to the extent known joints possess such sealing properties. Moreover, the sealing property should be maintained and retained even if the joint is released, i.e., even if repeatedly threading and unthreading and threading again is provided for. Moreover, the sealing should not deteriorate at high temperatures as they may be experienced in deep drill holes, such as 250 degrees Centigrade. Also, corrosive attacks should be resisted.

In accordance with the preferred embodiment of the present invention it is suggested to provide a joint between casings or tube members or between a tube member and a sleeve including respectively internal and external threadings to be threadedly combined to make up the joint. The particular improvement suggested here involves the provision of a groove in the pin member having a depth of at least 5% but not more than 20% of the diameter of the groove bottom and receiving a sealing ring of polytetrafluoroethylene which was heated prior to making up the joint to a temperature in excess of the conversation temperature from the crystalline state to the amorphous state but below the temperature in which the polytetrafluoroethylene becomes liquidous and also below the temperature at which decomposition occurs. The thus heated ring is applied and placed into the groove and cooled. It should be mentioned that the cooling does not involve cold water quenching but merely cooling in still or slightly moved air.

The inner surface of the box member or of a sleeve is provided with an internal threading for receiving the threading of the pin member, the threads being of conical configuration. An unthreaded surface portion of the box or sleeve member which will become radially aligned with the groove and the inserted sealing ring, is also of conical configuration. Moreover, in such a case, the PTFE ring should be cooled in axially unpressurized direction so that the cooling flow engages first that portion of the ring which will directly face the larger diameter portion of the facing conical sealing surface. Since the higher cooling rate results in a lower degree of shrinkage, one changes in fact the originally cylindrical ring into a conical ring having frustoconical inner and outer surfaces. The threading of the pin member into the inserted sleeve is facilitated by the conical outer surface of the ring as that surface will more easily coact with the conical sealing surface of the sleeve or box member.

Generally speaking, it should be mentioned that it is known to provide a rubber elastic sealing ring on a pin member. This, however, is not a representative suggestion for the present joint because these known rubber elastic rings when stripped over the thick pin are expanded and contract upon being seated in the groove and, therefore, will sit tightly thereon. This is not the case in the present PTFE ring. Such a ring is not resilient and is radially expanded for purposes of placement and only through the heating process, the cooling causes it to seat in the groove whereby, however, the above mentioned mode of cooling causes a conical deformation so that the ring does not sit tightly in every part of the groove.

The seal must be under mechanical pressure or tension in order to obtain a sealing function. Moreover, it was found that this particular material has certain creeping qualities when under pressure and at room temperature. For this reason, it is necessary to enclose, so to speak, the PTFE ring in a chamber like groove to avoid such creeping. This is very different from the placement of a rubber elastic ring in a more or less shallow groove.

In the case of oil field tubular goods, it is practical to provide, in effect, the conical sealing surface of the sleeve or the box member as a kind of continuation of the conical threading provided in the member. Moreover, it is of advantage to have the groove in which the ring is located merge into a pin member shoulder which cooperates with the end surface of the sleeve or box member. This feature offers the advantage that the PTFE ring can, in fact, be subjected to a very high pressure to obtain a proper sealing right at the critical area. Moreover, the cooling of the ring, particularly the progression as outline above, can be carried out via the shoulder surface of the pin member in order to obtain the desired conical configuration of the sealing ring. This way engagement with the groove bottom prior to and in the initial phases of cooling can be avoided.

DESCRIPTION OF THE DRAWINGS

While the specification concludes with the claims particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

FIG. 1 shows a longitudinal section view through one-half of a threaded joint between a pin member and a sleeve or a box member of oil field tubular goods and FIG. 2 shows a section view of a portion of the sealing ring used in the example shown in FIG. 1 for practicing the best mode of the present invention.

Proceeding now to the description of the preferred embodiment, FIG. 1 illustrates a pin member 3 of a connection for oil field tubular goods variety 3 whose pin portion is threaded into a box or sleeve member 2. The figures show a threaded joint as it has been made up, i.e., the threadings 4 are in full engagement. Moreover, the pin member 3 has a shoulder 6 which when the joint is made up is in abutment with the axial front and side of the box or sleeve member 2. Reference character A refers to the common access of members 2 and 3 for a made up joint.

The pin member 3 is provided with a groove between the threaded portion of the pin member and the abutment shoulder 6. This groove has a basically cylindrical bottom 7 with a radius R. The groove has a depth which is between 5% and 20% of the diameter of the groove bottom 7. The portion of the inner surface of the sleeve or box member 2 adjacent its axial end 5 is not provided with threading but instead defines a smooth frustoconical pressure surface 8 which is in full abutment with the outer surface of ring 1 when the joint is made up.

FIG. 2 illustrates the ring 1 as it is made in a separate working step. The inner diameter of that ring is essentially similar to the diameter of the groove bottom 7. The sleeve or box member 2 as well as the pin member 3 are provided separately with matching threadings at the illustrated places. Also, prior to making up the joint, the sealing ring 1 is placed into the groove of the pin member in the following manner.

The PTFE ring 1 as made is heated in a furnace to a temperature between 350 degrees Centigrade and 380 degrees Centigrade. This temperature is above the transition temperature between the crystalline and the amorphous state, but even at the higher temperature no liquidous flow occurs nor will the material decompose. Therefore, at this particular temperature, one obtains a ring which is amorphous and glass-clear. While still at that temperature, the ring 1 is placed onto the pin member 3 and easily clears the threading and locates in or at least adjacent to the groove at the shoulder 6. Through special tooling, one may hold the ring against the shoulder 6. The joint is not made up at that point.

Next a cooling step is provided through air flow which is caused to flow in such a manner that the portion of the ring adjacent the shoulder 6 is cooled first so that that portion cools more rapidly than the end of the ring nearer to the end of the pin member 3. This way one obtains a distortion of the ring 1, the ring assumes a conical configuration as shown in FIG. 1. It should be noted that the engagement of the ring with the bottom 7 of the groove should occur only in the last phases of the cooling, i.e., the ring should be held strictly concentrical to the groove which means that initially, i.e. after having been slipped on, it will not engage the bottom of the groove. Consequently, the ring has in particular an outer conical surface which will facilitate insertion into the box member. There is very little danger that the sleeve or box member 2 and particularly the shoulder 5 thereof will hit the sealing ring during threading.

The joint is made up after the ring 1 has been completely cooled whereupon the box or sleeve member is threaded onto the pin member with the requisite torque.

The invention is not limited to the embodiments described above; but all changes and modifications thereof, not constituting departures from the spirit and scope of the invention, are intended to be included.

We claim:

1. Gas tight joint between a pin member and a sleeve or a box member in oil field tubular goods wherein the pin member is provided with an outer threading and the sleeve or box member is provided with an internal threading to receive the threading of the pin member when the joint is made up comprising:
    an annular groove in the pin member having a depth of at least five percent (5%) but not more than twenty percent (20%) of the diameter of the bottom of the groove; and
    a polytetrafluoroethylene ring in the groove which has been heated to a temperature in excess of the crystalline amorphous transition temperature but below the liquification and decomposition temperatures of polytetrafluoroethylene for placement into the groove without stretching following which the ring was cooled to be seated in the groove of the pin member.

2. Joint as in claim 1 wherein the box or sleeve member is provided with a conical surface portion being radially aligned with the ring when the joint is made up.

3. Joint as in claim 2, said ring having been unequally cooled to be distorted to assume a conical configuration such that the outer surface matches, at least approximately, the conical sealing surface of the box or sleeve member.

4. Joint as in claim 1 wherein the groove is located on the side of the threading opposite the axial end of the pin.

5. Joint as in claim 1 wherein said threadings are conical and the groove is disposed between the threading in the pin member and a shoulder of the pin member against which the axial end of the box or sleeve member abuts when the joint is made up.

6. Joint as in claim 2 wherein said threadings are conical and the groove is disposed between the threading in the pin member and a shoulder of the pin member against which the axial end of the box or sleeve member abuts when the joint is made up.

7. Joint as in claim 3 wherein said threadings are conical and the groove is disposed between the threading in the pin member and a shoulder of the pin member against which the axial end of the box or sleeve member abuts when the joint is made up.

* * * * *